United States Patent
Shah et al.

(10) Patent No.: US 10,760,686 B2
(45) Date of Patent: Sep. 1, 2020

(54) WEAR RESISTANT PISTON SEAL

(71) Applicant: United Technologies Corporation, Farmington, CT (US)

(72) Inventors: Dilip M. Shah, Glastonbury, CT (US); Pantcho Stoyanov, West Hartford, CT (US); Chris Vargas, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 45 days.

(21) Appl. No.: 15/729,966

(22) Filed: Oct. 11, 2017

(65) Prior Publication Data

US 2019/0107202 A1 Apr. 11, 2019

(51) Int. Cl.
| | |
|---|---|
| *F16J 15/28* | (2006.01) |
| *F01D 11/00* | (2006.01) |
| *C22C 19/00* | (2006.01) |
| *F01D 11/12* | (2006.01) |

(52) U.S. Cl.
CPC .............. *F16J 15/28* (2013.01); *C22C 19/007* (2013.01); *F01D 11/12* (2013.01)

(58) Field of Classification Search
CPC .... F16J 15/28; F16J 9/26; F01D 11/12; C22C 19/007
See application file for complete search history.

(56) References Cited

U.S. PATENT DOCUMENTS

| | | | | |
|---|---|---|---|---|
| 3,839,024 | A * | 10/1974 | Demo, Jr. .......... | B23K 35/3033 148/425 |
| 6,968,615 | B1 | 11/2005 | More et al. | |
| 7,938,407 | B2 | 5/2011 | Datta et al. | |
| 2011/0081235 | A1* | 4/2011 | Shah ..................... | F01D 5/16 415/170.1 |
| 2012/0032404 | A1 | 2/2012 | Seib et al. | |
| 2015/0125281 | A1* | 5/2015 | Georgieva ......... | B23K 35/3033 415/200 |
| 2015/0125282 | A1* | 5/2015 | Georgieva ......... | B23K 35/3033 415/200 |
| 2016/0008867 | A1 | 1/2016 | Shah et al. | |
| 2016/0146033 | A1 | 5/2016 | LeBlanc et al. | |

(Continued)

OTHER PUBLICATIONS

Pawel Jozwik, "Applications of Ni3Al Based Intermetallic Alloys— Current Stage and Potential Perceptivities", Materials 2015 ISSN 1996-1944, May 13, 2015.*

(Continued)

*Primary Examiner* — Gilbert Y Lee
(74) *Attorney, Agent, or Firm* — Getz Balich LLC

(57) ABSTRACT

Aspects are directed to a tribological and creep resistant system configured to operate at temperature in excess of 750° C., comprising: a piston seal that includes a nickel base alloy, where the nickel base alloy includes a $Ni_3(Al,X)$ type precipitated phase in an amount greater than 40% by volume. Aspects are directed to a system comprising: a piston seal that includes a cobalt-based alloy. Aspects are directed to a method comprising: heat treating an ingot of a nickel base alloy that includes coarsening a precipitated phase to facilitate forging or wrought forming the ingot, machining the ingot to include a substantially flat surface, and processing the ingot to generate a piston seal.

9 Claims, 10 Drawing Sheets

(56) References Cited

U.S. PATENT DOCUMENTS

| | | | |
|---|---|---|---|
| 2016/0169018 A1* | 6/2016 | Solanki | F01D 11/003 415/168.2 |
| 2016/0312894 A1 | 10/2016 | McCaffrey et al. | |
| 2016/0326613 A1 | 11/2016 | Cui et al. | |
| 2017/0211401 A1* | 7/2017 | Cetel | F01D 11/005 |
| 2018/0179614 A1* | 6/2018 | Veliz | C22C 19/056 |
| 2019/0017401 A1* | 1/2019 | Stoyanov | C23C 26/00 |

OTHER PUBLICATIONS

European Search Report dated Dec. 12, 2018 for EP Application No. 18199901.2.
"Engineering Properties of IN-100 Alloy" https://www.nickelinstitute.org/~Media/Files/TechnicalLiterature/IN_100AlloyEngineeringProperties_483_.pdf.
Metal Tek International, "Cast Grade: MAR-M-247", https://www.metaltek.com/alloy-browser/specialty-alloys/vacuum-cast-nickel-cobalt-alloys/mtek-mm247.
TMS "Compositions of Typical Cast Superalloys", www.tms.org/Communities/FTAttachments/superalloystable_castcomp.pdf.
Alloy Wire International Ltd. "Technical Datasheet AWS 014 Rev. 1", 2016.
Metal Tek International, "Cast Grade: MAR-M-509", https://www.metaltek.com/alloy-browser/specialty-alloys/vacuum-cast-nickel-cobalt-alloys/mtek-mm509.
Cetel "Second Generational Nickel-Base Single Crystal Superalloy", Superalloys 1998, pp. 235-244.
Rolled Alloys, Inc. "Waspaloy" https://www.rolledalloys.com/alloys/cobalt-alloys/waspaloy/en/, Aug. 9, 2007.

* cited by examiner

| Chemical Composition | | |
|---|---|---|
| Element | Min % | Max % |
| C | -- | 0.08 |
| Mn | -- | 1.00 |
| Si | -- | 0.50 |
| S | -- | 0.01 |
| Cr | 14.00 | 17.00 |
| Ni | 70.00 | -- |
| Nb/Cb | 0.70 | 1.20 |
| Ti | 2.25 | 2.75 |
| Al | 0.40 | 1.00 |
| Fe | 5.00 | 9.00 |
| Co | -- | 1.00 |
| Ta | -- | 0.05 |
| Cu | -- | 0.50 |

*FIG. 5*

|     | Cr    | Ni      | Mo   | Co    | Al   | Ti   | B     | C    | Zr   | Fe   | Mn   | Si   | P     | S     | Cu   |
| --- | ----- | ------- | ---- | ----- | ---- | ---- | ----- | ---- | ---- | ---- | ---- | ---- | ----- | ----- | ---- |
| MIN | 18.00 | --      | 3.50 | 12.00 | 1.20 | 2.75 | 0.003 | 0.02 | 0.02 | --   | --   | --   | --    | --    | --   |
| MAX | 21.00 | Balance | 5.00 | 15.00 | 1.60 | 3.25 | 0.01  | 0.10 | 0.08 | 2.00 | 0.10 | 0.15 | 0.015 | 0.015 | 0.10 |

*FIG. 6*

|  | Al | Cr | Mn | Ni | Si | W | C | Co | Ta | Ti | Hf |
|---|---|---|---|---|---|---|---|---|---|---|---|
| MIN | 5.4 | 8.0 | 0.10 | Bal | 0.25 | 9.3 | -- | 9.0 | -- | -- | -- |
| MAX | 5.7 | 8.5 | 0.10 | Bal | 0.25 | 9.7 | 0.09 | 9.5 | -- | -- | -- |

*FIG. 7*

|  | C | Cr | Co | Mo | Ti | Al | V | Zr | B | Fe | Mn | Si | S | Ni |
|---|---|---|---|---|---|---|---|---|---|---|---|---|---|---|
| MIN | 0.15 | 8.0 | 13.0 | 2.0 | 4.5 | 5.0 | 0.7 | 0.03 | 0.01 | -- | -- | -- | -- | Bal |
| MAX | 0.20 | 11.0 | 17.0 | 4.0 | 5.0 | 6.0 | 1.2 | 0.09 | 0.02 | 1.0 | 0.2 | 0.2 | 0.02 | Bal |

FIG. 8

|  | Cr | Ni | W | C | Co | Ta | Ti | Zr |
|---|---|---|---|---|---|---|---|---|
| MIN | 22.5 | 9.0 | 6.5 | 0.55 | Bal | 3.0 | --- | --- |
| MAX | 24.4 | 11.0 | 7.5 | 0.65 | Bal | 4.0 | --- | --- |

*FIG. 9*

| | Ni | Cr | Mo | W | Re | Ta | Al | Co | Hf |
|---|---|---|---|---|---|---|---|---|---|
| NOM | Bal | 5.0 | 2.0 | 6.0 | 3.0 | 8.7 | 5.6 | 10.0 | 0.1 |

*FIG. 10*

WEAR RESISTANT PISTON SEAL

BACKGROUND

Gas turbine engines, such as those which power aircraft and industrial equipment, employ a compressor to compress air that is drawn into the engine and a turbine to capture energy associated with the combustion of a fuel-air mixture. An engine frequently includes one or more seals, Seals are used to isolate one or more regions of the engine. Seals help to ensure stable and efficient operation of the engine.

A piston seal is a type of seal that is frequently used in an engine. Referring to FIG. 2, a system 200 incorporating a piston seal 204 utilized in conjunction with the turbine section of the engine is shown. The piston seal 204 is shown in FIG. 2 as being slotted/seated in a groove 212 of a turbine frame vane 220.

The operating environment of the engine imposes significant requirements on the piston seal 204. For example, the operating temperature of the turbine section may approach, e.g., 870° C. in some engines. Such high/elevated temperatures may cause the material of the piston seal 204 to experience creep or stress relaxation (i.e., a decrease in stress based on a substantially equivalent amount of strain generated in a structure). Additionally, vibratory motion or energy in the engine may cause the piston seal 204 to experience significant wear. A location of the wear is denoted in FIG. 2 by dashed boxes 226 and 228.

Conventionally, the piston seal 204 has been made out of materials that include: (1) nickel-chromium alloy (e.g., Inconel X-750), and (2) a nickel-based superalloy (frequently available in commerce under the mark WASPALOY). Both of these materials have temperature limits below the aforementioned operating temperature of 870° C., such that their use in such an environment is unacceptable due to creep and/or stress relaxation. Additionally, the use of these materials fails to address the wear experienced by the piston seal 204 due to vibration. For example, chromium oxide ($Cr_2O_3$) and aluminum oxide ($Al_2O_3$) may form on a surface of the piston seal 204 during engine operation, resulting in one or more of creep, stress relaxation, or wear of the piston seal 204. In some instances, as cross-sectional area is lost to, e.g., oxidation or wear, stresses may increase. This increase in stress may tend to exacerbate/increase creep, stress relaxation, or wear. The presence of oxides can increase friction, and consequently, frictional heating. In some instances, the oxides may degrade a material of component(s) (e.g., turbine frame vane 220) that interface to the piston seal 204. Often, these component(s) are more expensive in terms of, e.g., material or manufacturing processes than the piston seal 204.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a tribological and creep resistant system configured to operate at temperature in excess of 750° C., comprising: a piston seal that includes a nickel base alloy, where the nickel base alloy includes a $Ni_3(Al,X)$ type precipitated phase in an amount greater than 40% by volume. In some embodiments, the nickel base alloy includes aluminum at least in excess of 2.0% by weight. In some embodiments, the nickel base alloy includes chromium at least in excess of 4.0% by weight. In some embodiments, the nickel base alloy includes cobalt at least in excess of 4.0% by weight. In some embodiments, the system comprises a component that comprises a groove that seats the piston seal. In some embodiments, the component is a hot section component of a turbine, and the system comprises a shim seated in the groove, where the piston seal interfaces to the shim.

Aspects of the disclosure are directed to a system comprising: a piston seal that includes a cobalt-based alloy. In some embodiments, the alloy includes chromium at least in excess of 19% by weight. In some embodiments, the system comprises a component that comprises a groove that seats the piston seal. In some embodiments, the component is a hot section component of a turbine.

Aspects of the disclosure are directed to a method comprising: heat treating an ingot of a nickel base alloy that includes coarsening a precipitated phase to facilitate forging or wrought forming the ingot, machining the ingot to include a substantially flat surface, and processing the ingot to generate a piston seal. In some embodiments, processing the ingot comprises a post-heat treatment such that a component that mates with the piston seal is worn in an amount less than a threshold. In some embodiments, forging the ingot comprises swaging or rotary forging of the ingot. In some embodiments, forging the ingot comprises an extrusion of the ingot. In some embodiments, the method comprises obtaining the ingot by casting the ingot to achieve an equiaxed grain structure or by directional solidification to obtain a columnar grain structure or a single crystal of a predetermined crystal orientation to achieve a predetermined Young's modulus. In some embodiments, the method comprises applying a heat treatment to the piston seal. In some embodiments, the method comprises treating a surface of the piston seal to develop an oxide layer on the surface. In some embodiments, the method comprises installing a shim in a hot section component, and installing the piston seal such that the piston seal interfaces to the shim.

Unlike advanced hot section components like blades, performance requirements of a high temperature piston seal are very unique. It is recognized that to meet the high temperature performance, alloys typically used for an advanced component like a blade may be used, but neither high tensile properties, nor high stress creep resistance are necessarily required. Rather a balance between mechanical behavior and tribological behavior may be required. A reduced (e.g., minimum) wear of a seal over its life may be required for durability, but at the same time it may be required that the seal does not wear the major component the seal protects. Achieving this balance with the ability to fabricate a very large diameter (in excess of 3 feet) ring with good dimensional tolerance is not trivial. Since the science of tribological behavior of this class of alloys is not well developed, a laboratory based test may be used to determine the wear criteria for the piston and major component wear couple is achieved.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

FIG. 5 illustrates a nominal range in terms of chemical composition by weight of Inconel X-750.

FIG. 6 illustrates a nominal range in terms of chemical composition by weight of a nickel-based superalloy (e.g., available under the mark WASPALOY).

FIG. 7 illustrates a nominal range in terms of chemical composition by weight of MAR-M-247, a typical blade alloy with equi-axed grain structure.

FIG. 8 illustrates a nominal range in terms of chemical composition by weight of IN-100, a typical low density blade alloy with equi-axed grain structure.

FIG. 9 illustrates a nominal range in terms of chemical composition by weight of M-509, a typical cobalt base alloy.

FIG. 10 illustrates nominal values terms of chemical composition by weight of PWA 1484, an advanced single crystal alloy.

DETAILED DESCRIPTION

Figure 1:
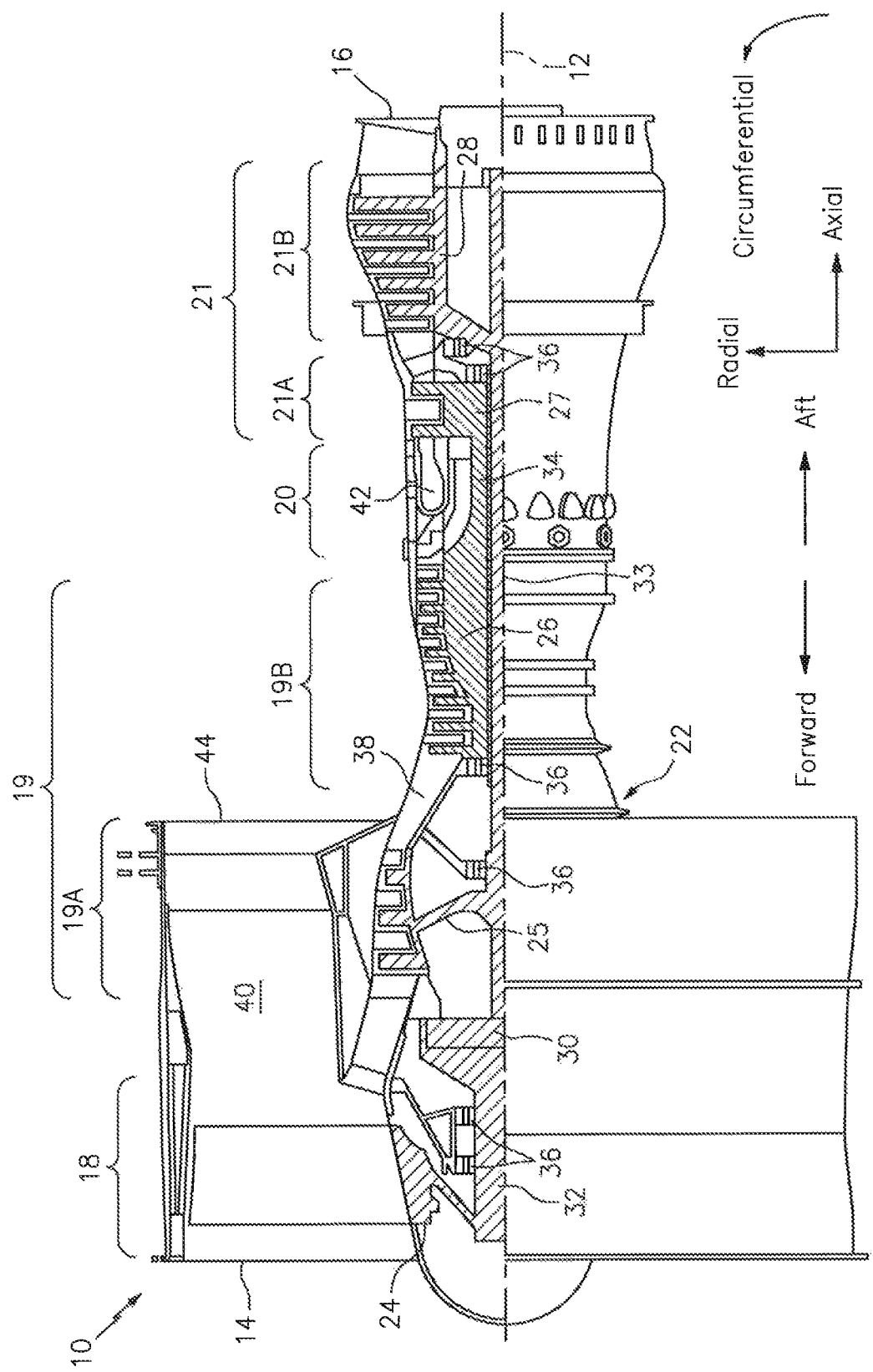
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for enhancing the creep capability and wear resistance of a piston seal. In some embodiments, a piston seal may include/be formed from a wrought single crystal alloy or a wrought equiaxed alloy. In some embodiments, a shim may be included at a surface/interface of a piston seal to assist in reducing wear.

A material that may be used in accordance with aspects of this disclosure may be referred to as being element-based. An element-based material is a material that includes 50% or more of the element as a base element by weight. For example, a cobalt-based material is a material that includes at least 50% cobalt by weight. Similarly, a nickel-based material is a material that includes at least 50% nickel by weight. Cobalt-based materials may provide advantages in terms of wear-resistance relative to other materials (e.g., nickel-based materials). Nickel-based materials may provide advantages in terms of creep resistance relative to other materials.

In some embodiments, a material (e.g., a nickel-based alloy) that is used may include a precipitated phase ($\gamma'$) that is greater than a threshold amount. For example, in some embodiments the precipitated phase may be greater than 40%. Traditionally, such materials have been difficult to work with (e.g., have been difficult to shape into an appropriate form factor); however, application of one or more treatments (e.g., heat treatment 310, finishing 340 of FIG. 3) to the material may enable the material to be more readily worked (e.g., forging 316 of FIG. 3).

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for a geared turbine engine 10. Aspects of the disclosure may be applied in connection with other environments, including additional configurations for engines. Aspects of the disclosure may be applied in the context of a non-geared engine.

Figure 3:
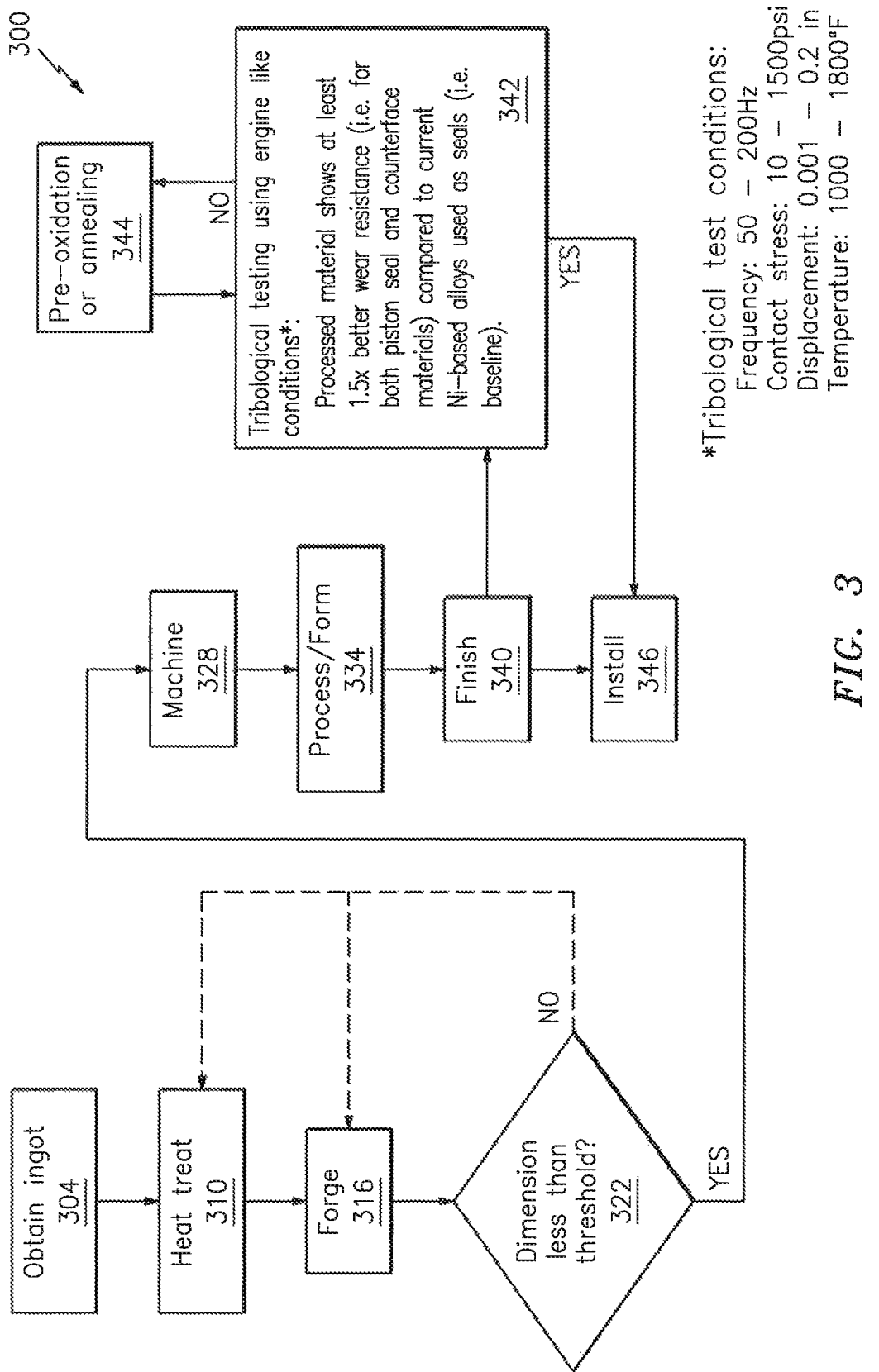
FIG. 3 illustrates a flow chart of a method for manufacturing a piston seal in accordance with aspects of this disclosure.

In some embodiments a piston seal may include/be formed from one or more materials, such as for example a wrought single crystal alloy such as PWA 1484, or a wrought equi-axed alloy (e.g., MAR-M-247, IN-100), or a cobalt based alloy such as (MAR-M-509, etc.). Referring to FIG. 3, a method 300 for manufacturing a piston seal is shown. The method 300 is described in further detail below.

In block 304, an ingot of the material of the piston seal may be obtained. As part of block 304, the ingot may be cast.

In block 310, the ingot may be subjected to one or more heat treatments. As part of block 310, the ingot may be subject to an annealing procedure/technique where the ingot may be heated to temperature and then allowed to cool slowly to remove/eliminate potential stresses and/or coarsen the precipitates. Additional annealing may be carried out in order to keep the material soft and prevent the piston seal from wearing into one or more mating surfaces (e.g., the vane 220—see FIGS. 2 and 4) once the piston seal is installed in an engine. One or more of the aspects of block 310 (e.g., annealing) may be implemented as part of block 340 described below, potentially in lieu of implementing the aspect(s) as part of block 310.

In block 316, the ingot may be subjected to a forging procedure/technique. As part of block 316, the ingot may be subjected to swaging (e.g., radial forging or extrusion/tube swaging) in order to alter one or more dimensions of the ingot. For example, the forging of block 316 may tend to alter (e.g., decrease) a diameter of the ingot and alter (e.g., increase) a length of the ingot. The forging of block 316 may increase a hardness of the (material of the) ingot. The forging of block 316 may be performed at a temperature that is below a recrystallization temperature associated with the material of the ingot, primarily if it is a single crystal alloy.

In block 322, a determination may be made whether one or more dimensions of the ingot are less than a threshold. If so (e.g., the "yes" path is taken out of block 322), flow may proceed to block 328. Otherwise, flow may proceed from block 322 to one of blocks 310 and 316.

The threshold of block 322 may be selected/specified to provide for a reduction of the ingot of block 304 on the order of four-to-one (4:1). In other words, once the ingot has been processed in accordance with the flow/loop between the blocks 310-322, the ingot may be approximately 25% of the size/dimension that it was in block 304. Other values for the threshold/reduction may be used in some embodiments. The flow between the blocks 310-322 may provide benefits in terms of, e.g., high temperature casting and wrought processing.

In block 328, the ingot may be subjected to machining. For example, block 328 may include grinding, electro-discharge machining (EDM), etc. The machining operation of block 328 may be used to produce large volumes of substrate that can be processed in accordance with block 334. The machining operation of block 328 may be used to provide a substantially flat surface in order to provide adequate sealing with respect to one or more mate faces that interface with the piston seal.

In block 334, the substrate may be processed to form the shape/dimensions of the piston seal.

In block 340, one or more finishing operations may be applied to the piston seal formed in block 334. For example, one or more heat treatments may be applied to the piston seal in block 340. One or more surfaces of the piston seal may be treated as part of block 340 to develop an oxide layer/film on the surface; such an oxide layer may provide for a reduction in friction as described further below. The operations of block 340 may address (e.g., eliminate or reduce the likelihood of) the piston seal being subject to distortion when installed on the engine.

Since tribological behavior of the material depends on its wear characteristics vis-a-vis the material of the major component, a laboratory based tribological test may be used in block 342 to determine if performance criteria is achieved. If it is not, variation in heat treatment or pre-oxidation heat treatment in certain controlled environment(s) may be used to alter the surface condition in block 344. Since there is no clear scientific way to assess this a priori, in a practical sense if this is better than at least 1.5× better compared to a current baseline material (e.g., such as a material sold under the mark Waspaloy®), it may be defined as acceptable.

In block 346, the piston seal may be installed. For example, the piston seal may be installed/seated in a groove/recess of a turbine vane. In some embodiments, the installation of block 346 may include coupling (e.g., interfacing) the piston seal with a shim as described further below. Block 346 may include an installation of the shim as well.

The method 300 is illustrative. In some embodiments, one or more of the blocks (or a portion thereof) may be optional. In some embodiments, additional blocks not shown may be included. In some embodiments, the blocks (or one or more portions thereof) may execute in an order/sequence that is different from what is described above and shown in FIG. 3. For example, in some embodiments, (at least a portion of the) heat treatment of block 310 may be performed subsequent to the forging of block 316.

Figure 4:
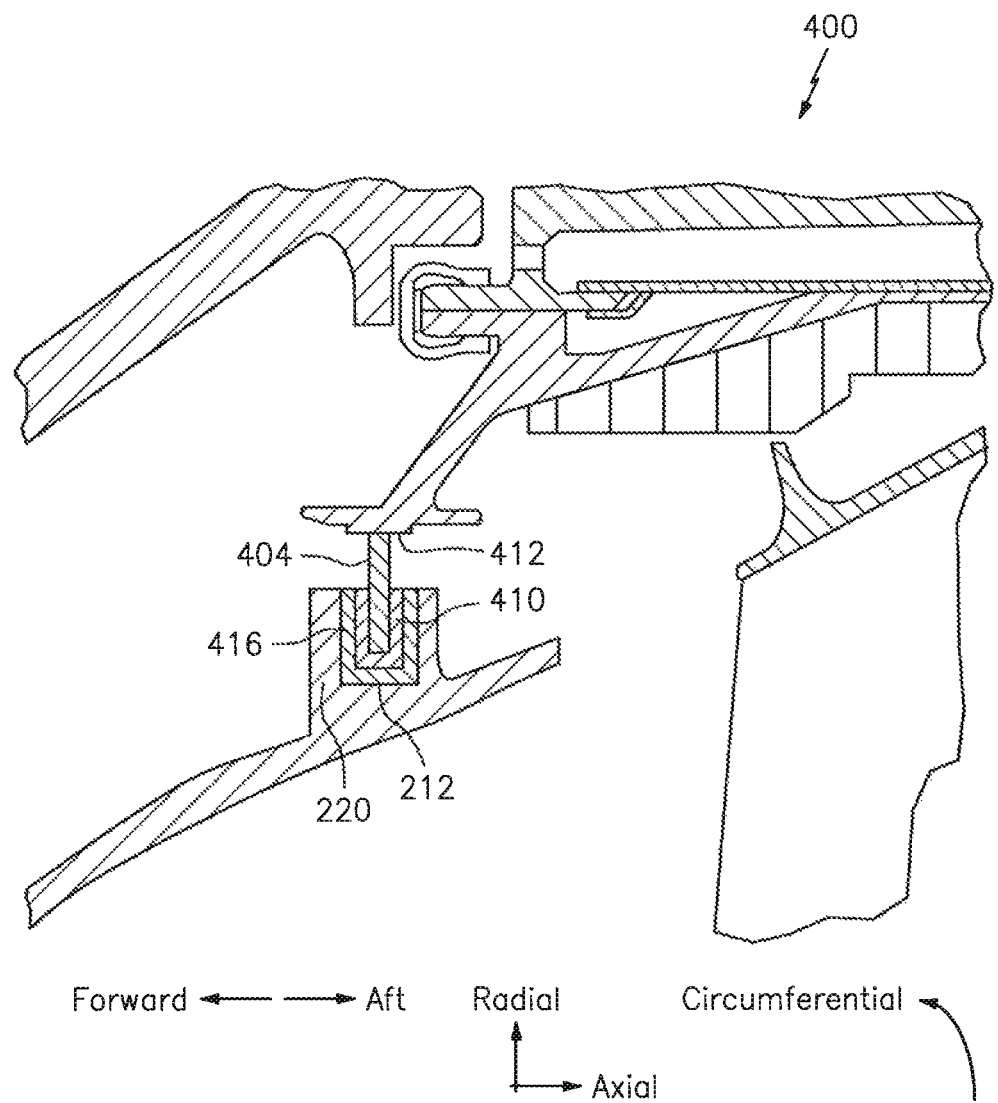
FIG. 4 illustrates a sealing system that incorporates a piston seal in accordance with aspects of this disclosure.

Referring to FIG. 4, a system 400 incorporating a piston seal 404 in accordance with aspects of this disclosure is shown. The piston seal 404 may include/be formed from one or more of the materials described herein. The piston seal 404 may be manufactured/fabricated in accordance with one or more portions/aspects of the method 300 described above. The piston seal 404 may be manufactured as a full-hoop/ring. The piston seal 404 may be manufactured as a plurality of segments; the segments may be assembled together to form a full-hoop/ring.

Figure 2:
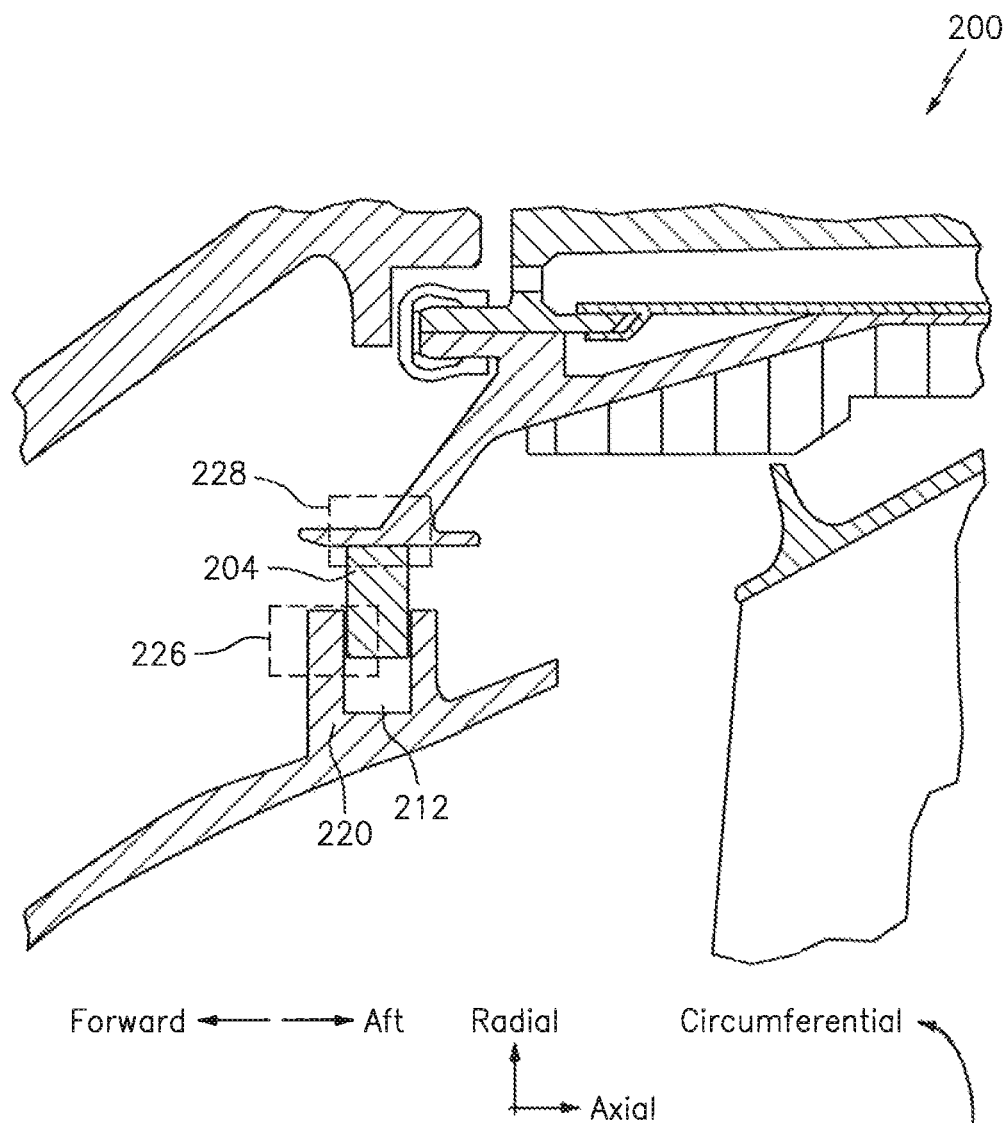
FIG. 2 illustrates a prior art sealing system that incorporates a piston seal.

As shown in FIG. 4, the piston seal 404 may be slotted/seated in the groove 212 of the turbine frame vane 220 (cross-reference FIG. 2). In other words, in some embodiments the piston seal 404 may serve as a substitute/replacement for the piston seal 204 of FIG. 2.

In some embodiments, one or more shims (as reflected by shim 410 in FIG. 4) may be included. For example, the shim 410 may be located/placed in between the piston seal 204 and the vane 220. The shim 410 may be composed of the same material as the piston seal 204. The shim 410 may be composed of super over aged—coarse γ' PWA 1484 in some embodiments. In some embodiments, the shim 410 may include a cobalt-based alloy. To the extent that the shim 410 incurs wear, the shim 410 may he easily exchanged with a replacement shim 410. In some embodiments, the shim 410 may be brazed in place.

In some embodiments, the piston seal 404 may seal against/share an interface with one or more surfaces. For example, the piston seal 404 may seal on a (flat) surface of the turbine frame vane 220 or the shim 410. The piston seal 404 may seal on a surface 412. The surface 412 may serve as a radial surface with respect to the piston seal 404. The surface 412 may correspond to a seal land in some embodiments.

In some embodiments, such as during the first few runs/cycles of an engine operation, an oxide layer (e.g., a cobalt-based oxide layer) may be formed at one or more interfaces (e.g., an interface between two of the vane 220, the shim 410, and the piston seal 404). For example, an oxide layer 416 is shown between the vane 220 and the shim 410. The oxide layer(s) may tend to lubricate the interface(s), resulting in lower frictional heating and wear of the piston seal 404 (see FIG. 4) relative to the frictional heating and wear experienced by the piston seal 204 (see FIG. 2). Additionally, any oxide film created on the piston seal 404 may transfer to counterface/mating surfaces, creating a low-friction oxide-on-oxide interface.

FIGS. 5-10 illustrate the chemical compositions (in terms of element by percentage weight) of some of the materials that are described herein. In terms of conventions used in FIGS. 5-10: (1) the abbreviation "MIN" or "Min" represents a minimum value, (2) the abbreviation "MAX" or "Max" represents a maximum value, (3) the abbreviation "NOM" represents a nominal value, (4) "Balance" or the abbreviation "Bal" represents a balance such that the respective row or column sums to 100%, and (5) the '−' character reflects zero or trace amounts of the respective element. Furthermore, the values shown are illustrative; one skilled in the art will appreciate that a value (in terms of a minimum value, a maximum value, or a nominal value shown in the figures) for a particular element may be varied by, e.g., +/−0.1%, +/−0.5%, +/−1%, +/−2%, +/−3%, +/−4%, or +/−5% (while still being greater than or equal to zero percent). Moreover, additional elements not shown in the figures may be included for a given material.

In some embodiments, an alloy may have a composition of the form $Ni_X Al_Y$, where X and Y are integers. For example, in some embodiments X may be equal to three and Y may be equal to one. The ratio of X to Y may reflect the relative composition of nickel to aluminum. Continuing the above example where X is three and Y is one provides that one unit (e.g., atom) of aluminum is present for every three units of nickel.

Aspects of the disclosure may provide for a piston seal having superior creep capability relative to conventional piston seals. For example, wrought single crystals used for piston seals of this disclosure may provide an improvement on the order of 200° C. in terms of temperature capability relative to conventional wrought alloys. Similarly, wrought equiaxed alloys used for piston seals of this disclosure may provide an improvement on the order of 100° C. in terms of temperature capability relative to conventional wrought alloy such as Inconel X750.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A tribological and creep resistant system configured to operate at temperature in excess of 750° C., comprising:
   a turbine frame vane;
   a piston seal that includes a nickel base alloy, the piston seal seated in a groove of the turbine frame vane; and
   a shim comprising a material that includes the nickel base alloy, the shim located in between the piston seal and the turbine frame vane,
   wherein the nickel base alloy includes a $Ni_3(Al,X)$ type precipitated phase in an amount greater than 40% by volume.

2. The system of claim 1, wherein the nickel base alloy includes aluminum at least in excess of 2.0% by weight.

3. The system of claim 1, wherein the nickel base alloy includes chromium at least in excess of 4.0% by weight.

4. The system of claim 1, wherein the nickel base alloy includes cobalt at least in excess of 4.0% by weight.

5. The system of claim 1,
   wherein the piston seal interfaces to the shim.

6. The system of claim 1, further comprising a cobalt-based oxide layer formed at an interface between the shim and the turbine frame vane.

7. The system of claim 6, wherein the material of the shim is composed of a super-over-aged, coarse nickel base alloy.

8. The system of claim 7, wherein the nickel base alloy is PWA 1484.

9. A system comprising:
   a turbine frame vane;
   a piston seal that includes a cobalt-based alloy, the piston seal seated in a groove of the turbine frame vane; and
   a shim located in between the piston seal and the turbine frame vane,
   wherein the alloy includes chromium at least in excess of 19% by weight, and
   wherein the shim is composed of a same material as the piston seal.

* * * * *